March 15, 1966  H. KLAUE  3,240,292
AXIALLY SPREADING TYPE DISK BRAKE
Filed April 1, 1963  7 Sheets-Sheet 2

March 15, 1966   H. KLAUE   3,240,292
AXIALLY SPREADING TYPE DISK BRAKE
Filed April 1, 1963   7 Sheets-Sheet 3
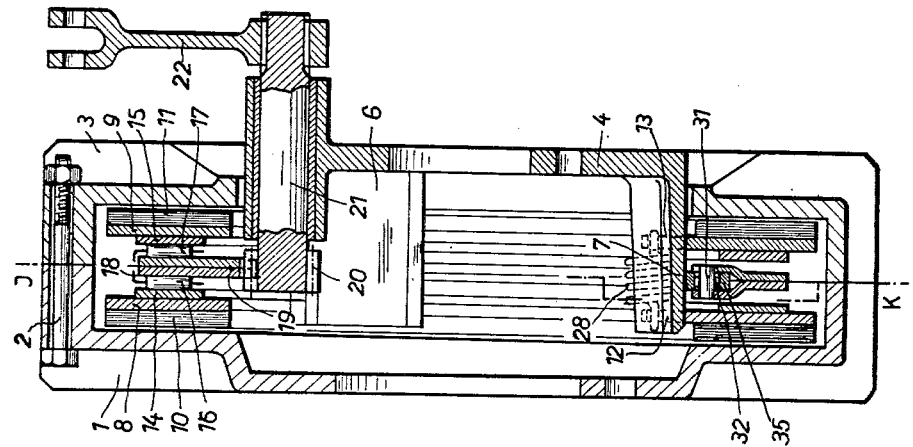
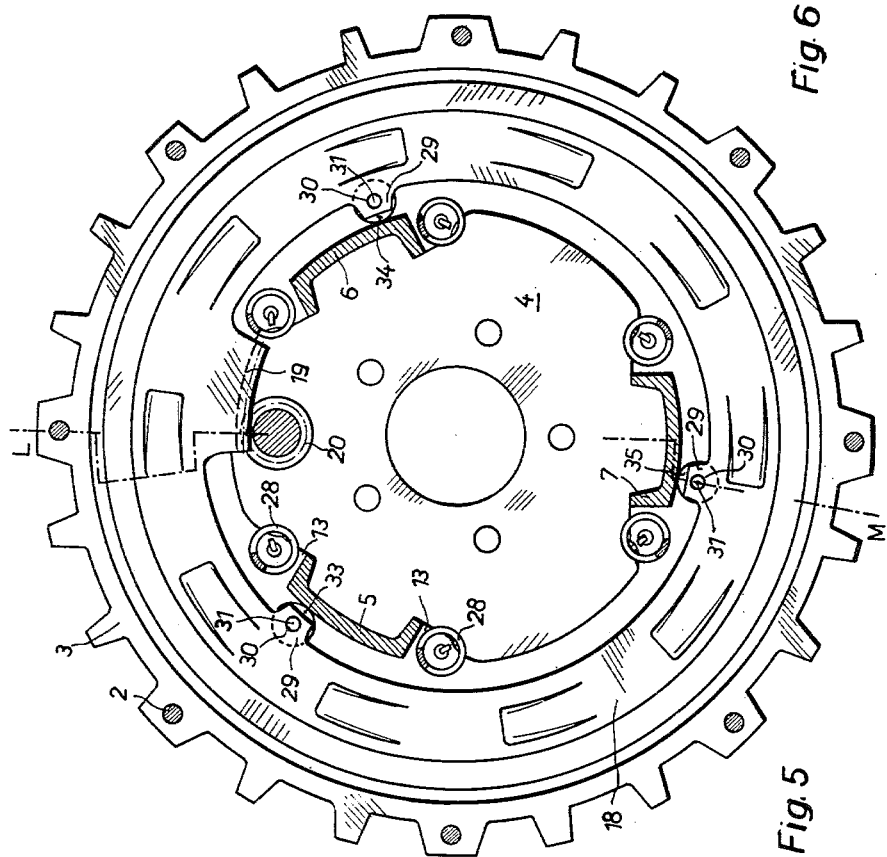

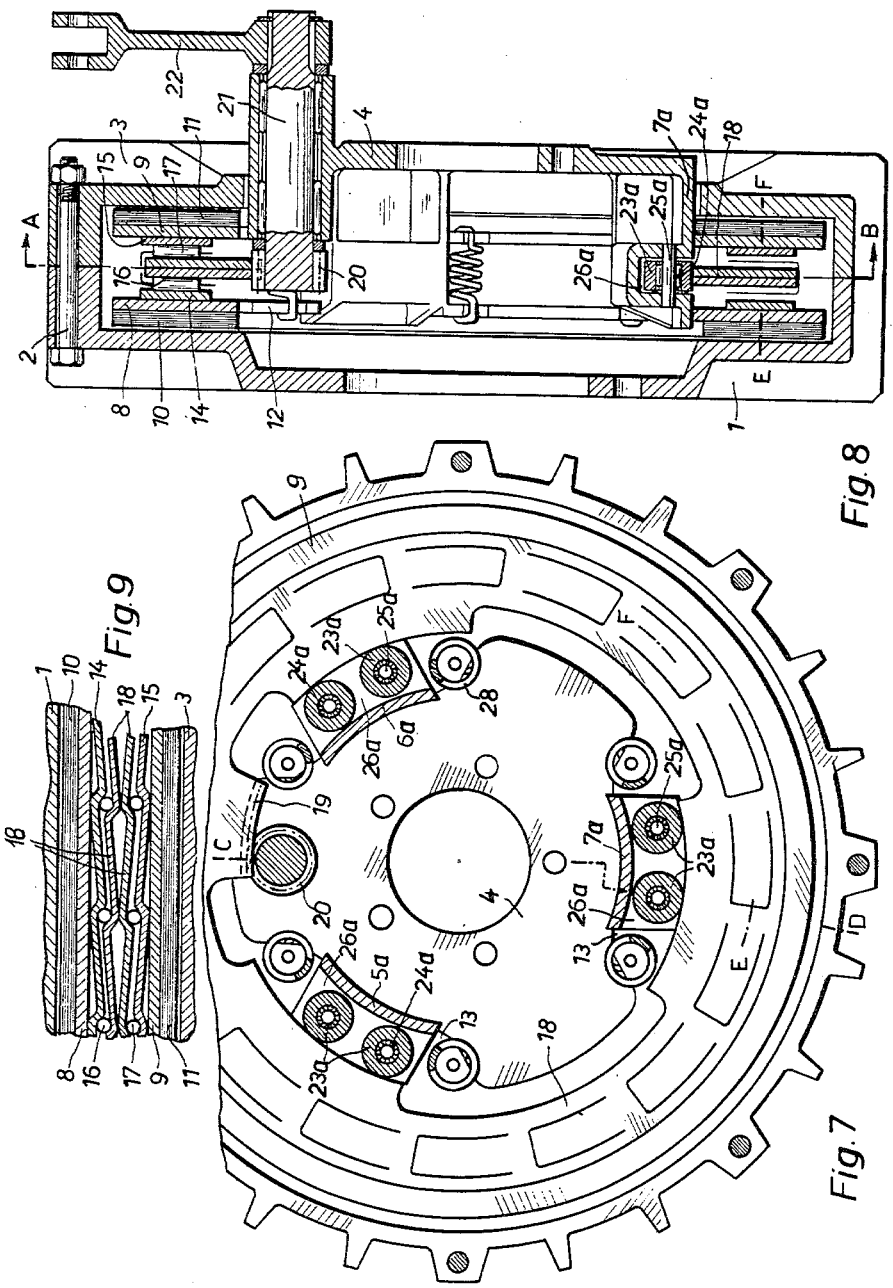

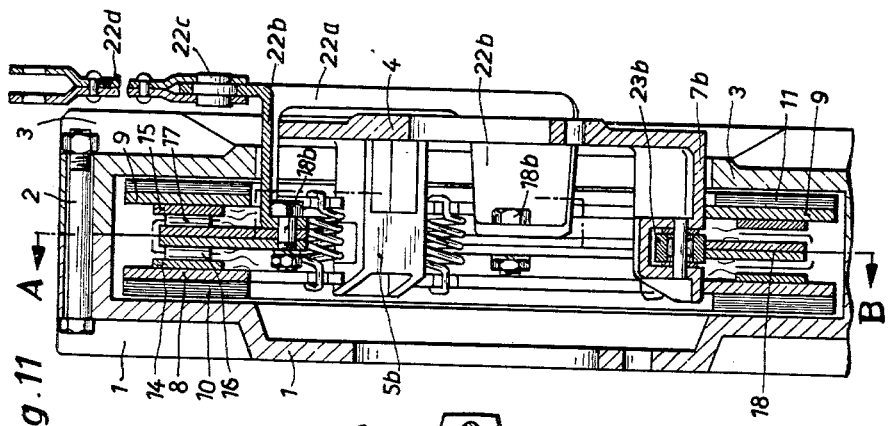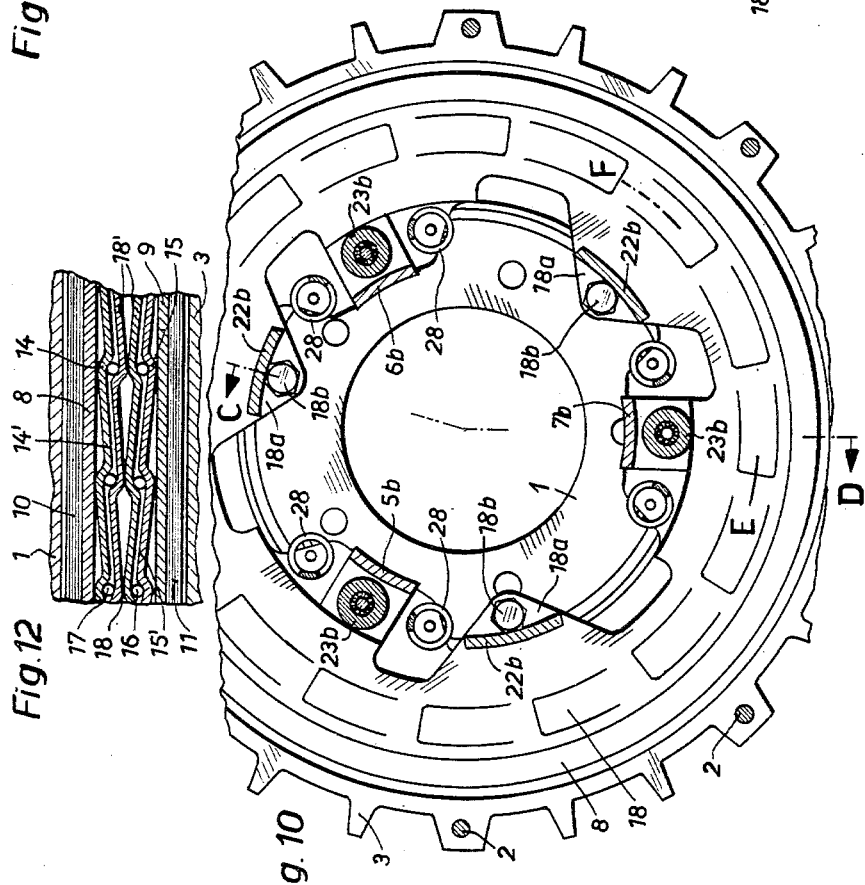

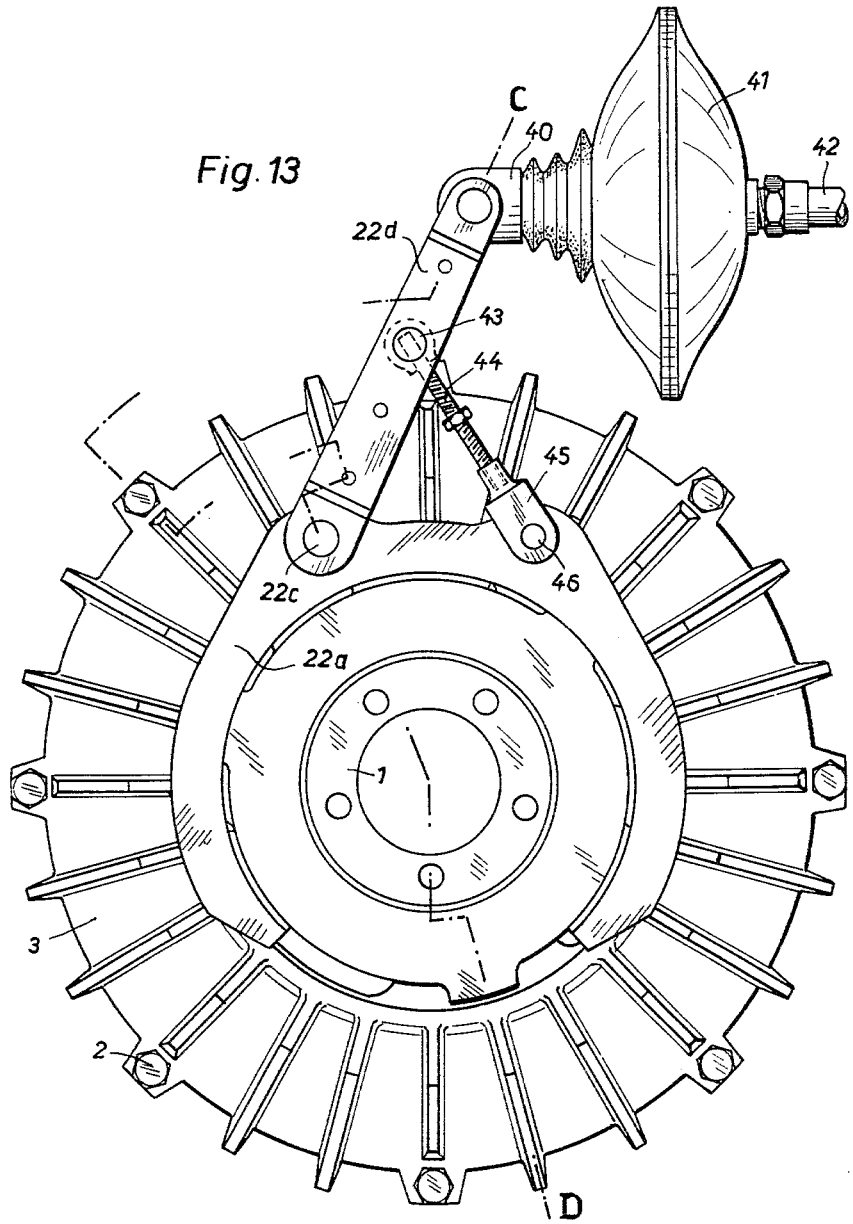

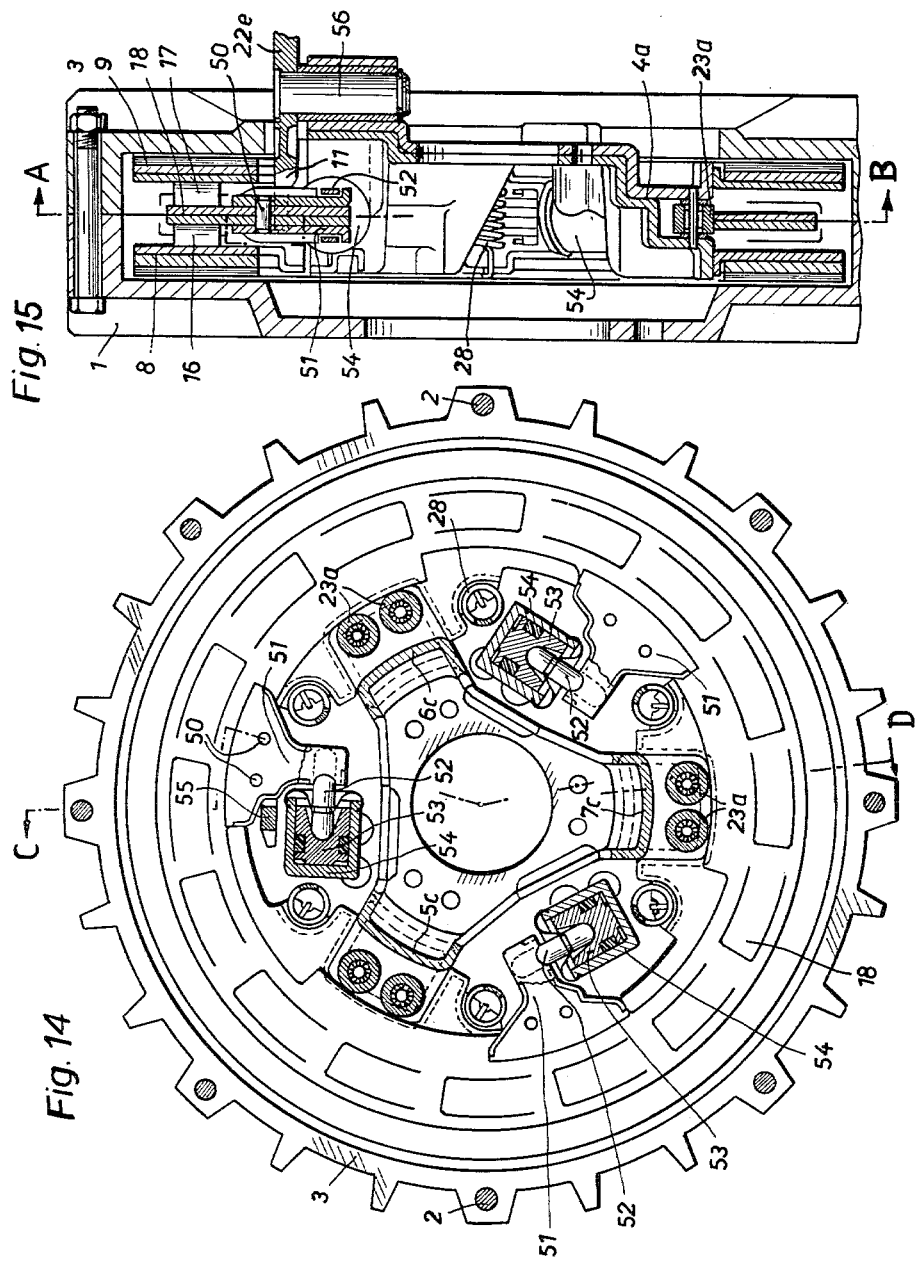

United States Patent Office 3,240,292
Patented Mar. 15, 1966

3,240,292
AXIALLY SPREADING TYPE DISK BRAKE
Hermann Klaue, 3 Ave. des Planches,
Montreux, Switzerland
Filed Apr. 1, 1963, Ser. No. 269,314
Claims priority, application Germany, Apr. 5, 1962,
K 46,387; Apr. 12, 1962, K 46,459; Apr. 24, 1962,
K 47,320
10 Claims. (Cl. 188—72)

This invention relates to a disk brake which is free of reinforcements and which comprises a revolving brake housing in which two brake disks carrying brake linings are arranged, so as to be axially movable on a brake carrier, but not rotatable in circumferential direction. The brake disks are operatively connected to each other by means of rolling coupling members which coact with wedge surfaces which are ascending or inclined in circumferential direction, and of a brake actuating ring mounted coaxially with the brake disks. A rotation of the brake actuating ring has the effect of forcing the brake disks against opposite inner surfaces of the revolving brake housing.

It has already been proposed in such disk brakes to mount the actuating ring on the brake carrier by the intermediary of rollers or balls.

One of the objects of the invention is a further development of disk brakes so that a rolling mounting of the actuating ring can be applied also in case of brakes in which the actuating ring is angularly moved, e.g. by a pinion which meshes with a gear segment connected with the actuating ring, or by means of a similar transmission gearing. In this case the brake carrier supporting the brake disks must be interrupted at the point where the pinion operating members are mounted, so that a roller or ball mounting extending around the entire circumference of the brake housing cannot easily be applied.

A conventional roller or ball mounting of the actuating ring including a roller or ball cage is not applicable at all in the case of a brake carrier in which axially directed brackets engaging recesses of the brake disks carry the brake disks, and pinion operating means are arranged between two brackets of the brake carrier.

According to the invention the brake carrier is provided with axially extending brackets on which the brake disks are mounted and with at least three individual rolling bodies arranged radially between these brackets and the operating ring and destined to center the operating ring. For a perfect guiding action of the actuating ring at least three rolls are required, which, moreover, must admit an axial mobility of the actuating ring. When the brake carrier comprises four brake disk carrying brackets, then it is suitable to provide four supporting rollers on the actuating ring, but in the case of six brake disk carrier brackets, three rollers will suffice again.

The operating pinion preferably is mounted between two supporting brackets. However, it is also possible to provide only two axial brackets which are broad in circumferential direction, to receive the brake disks on the brake carrier. When the pinion for turning the actuating ring is mounted at one side of the housing between the two carrying brackets altogether three supporting rollers are sufficient, in which case two rollers are arranged on the supporting bracket situated opposite the mounting of the pinion and one roller is disposed laterally of the pinion mounting. However, four rollers may also be provided in this case.

According to the invention rings may be used as supporting rollers, which rings are enclosed in the manner of a cage by the actuating ring which may consist of two sheet metal parts, whereby the outside face of the brake carrier brackets serves as inner rolling surface for the supporting ring, the rolling surface being circularly curved having its center on the axis of the brake, while the outer circularly curved rolling surface of the supporting ring is formed by two flaps of the two halves of the actuating rings, which flaps are symmetrically curved towards each other. Another modification of the roller guide assembly consists in providing pins or bolts, on the brake actuating ring at the roller support points, on which pins cylindrical rollers are mounted suitably by means of needle bearings, and are supported upon the brackets of the brake carrier.

The supporting rollers may be journaled in the middle of the brake carrier brackets on pins which are firmly connected with the brake carrier brackets. Suitably the mounting upon the pins is effected by means of roller bearings. The supporting rollers must be formed of such a width that the brake unit which remains stationary within the revolving brake housing and consists of brake disks and brake actuating ring can carry out an axial movement. An advantage of this roller support arrangement is that owing to the disposition within a recess of the brake carrier brackets, the mounting of the rollers is protected against brake dust, so that any risk of soiling is eliminated to a substantial extent.

The invention will now be more particularly described by way of example with reference to the accompanying drawings, in which:

FIGURE 5 is a transverse section along the line I—K of FIGURE 6 and shows a second example of a disk brake having the centering of the actuating ring obtained by rollers which are mounted on pins.

FIGURE 6 is an axial section along the line L—M of FIGURE 5,

FIGURE 7 is a transverse section through a further example of a disk brake along the line A—B of FIGURE 8, the actuating ring being centered by rollers arranged within the brake carrier.

FIGURE 8 is an axial section along the line C—D of FIGURE 7,

Figure 1:
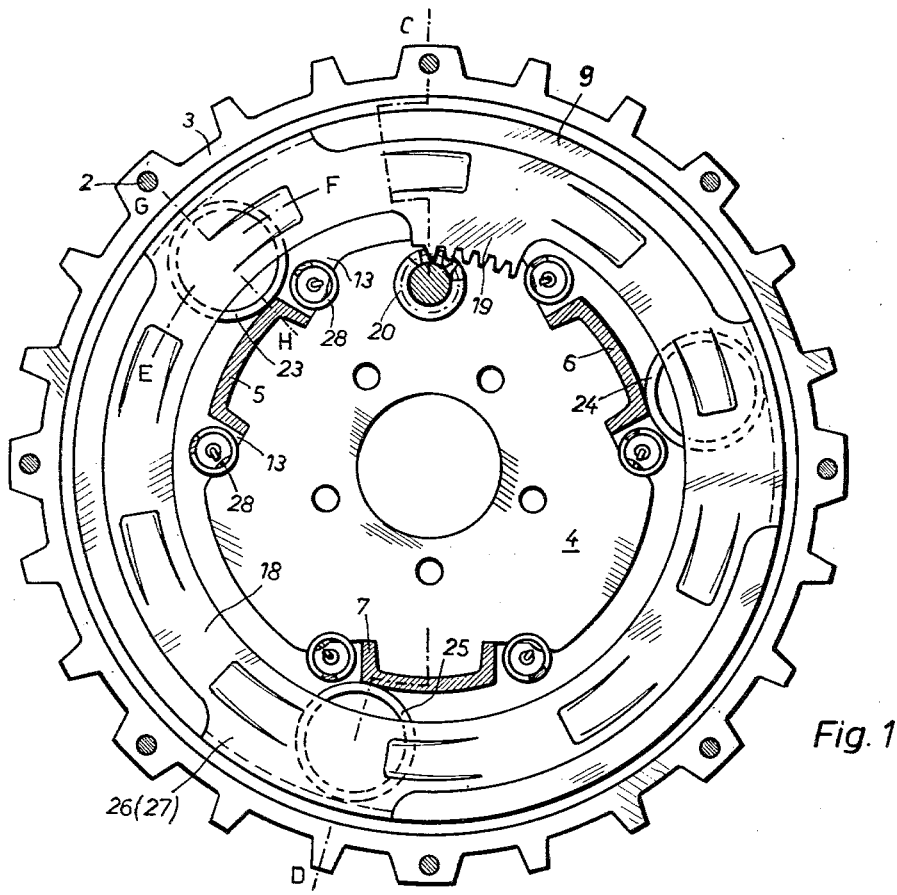
FIGURE 1 is a transverse section through a disk brake provided with an annular centering of the actuating ring, the section being taken along line A—B of FIGURE 2.

FIGURE 9 is a section extending in circumferential direction along the line E—F of FIGURE 7, FIGURE 10 is a fragmentary transverse section through a further example of a brake taken along the line A—B of FIGURE 11, FIGURE 11 is an axial section on the line C—D of FIGURE 10, FIGURE 12 is a fragmentary section through the brake disks, the brake lining, and the brake actuating ring along the line E—F of FIGURE 10, FIGURE 13 is a view in elevation showing the brake according to FIGURE 10 in combination with the brake actuating member, FIGURE 14 is a transverse section of a further modified brake, taken along the line A—B of FIGURE 15, FIGURE 15 is an axial section along the line C—D of FIGURE 14.

Referring to the drawings the numeral 1 always designates the radially ribbed brake housing which rotates together with the wheel of the motor car and which is connected by means of screw bolts 2 to a ribbed brake cover 3, the housing 2, the cover 3 and the members contained therein forming a brake unit.

Figure 3:
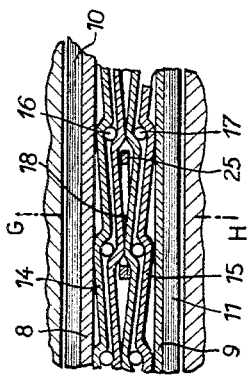
FIGURE 3 is a section in circumferential direction along the line E—F of FIGURE 1.
Figure 4:
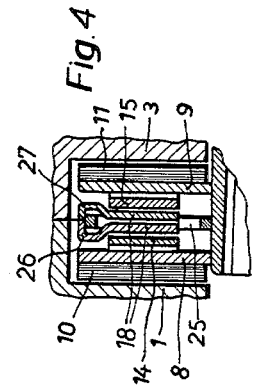
FIGURE 4 is a partial radial section along the line G—H of FIGURE 1.
Figure 2:
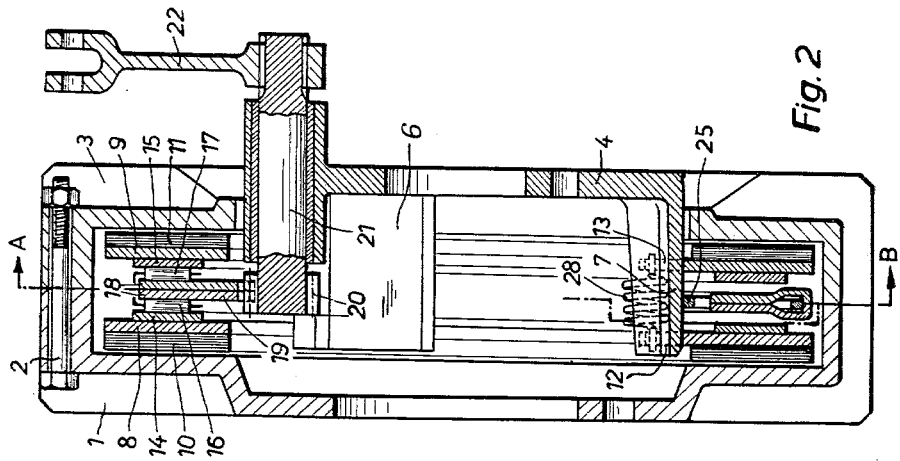
FIGURE 2 is an axial section along the line C—D of FIGURE 1.

In the examples of FIGURES 1 to 6, the brake carrier 4 which is screwed to an axle portion of the motor car, comprises three brackets 5, 6 and 7, upon which the two brake disks 8 and 9 are slipped so as to be freely movable in axial direction, but fixed with respect to the brake housing in circumferential direction. Brake linings 10 and 11 are adhesively affixed to the sides of the brake disks facing the abutting surfaces of the housing. Projecting portions 12 and 13 provided on the brake disks 8 and 9, respectively, transmit the braking moment to the brake carrier 4. Firmly connected to the brake disks 8 and 9 are pressure rings 14 and 15, respectively, which are stamped from sheet metal and provided with path sections uniformly distributed around the circumference and ascending or inclined in circumferential direction. Rollers 16 and 17 serving as coupling members interconnect the pressure rings 14, 15 with a composite operating ring 18 which is combined of two specularly arranged sheet metal rings and forms path sections which ascend or are inclined on both sides of the ring 18 in circumferential direction and are angularly displaced with respect to the inclined paths of the pressure rings.

Between the brackets 5 and 6 of the brake carrier 4, the operating ring 18 is provided with an inwardly projecting extension 19 which is provided with internal gear teeth engaging with a pinion 20 of an operating shaft 21 mounted in the brake carrier 4. A lever 22 is keyed to the shaft 21 to transmit the braking force into the brake.

When operating the brake, the shaft 21 is rotated by a pivoting movement of the lever 22. The pinion 20 turns the ring 18, the rolls 16 and 17 climb up on the inclined paths and the brake linings are urged against the abutting surfaces of the brake housing 1 and the brake cover 3.

The radial forces to which the actuating ring 18 is subjected when operating the brake by the pinion are taken up in the example according to FIGURES 1 to 4 by rings 23, 24 and 25 which bear against the brackets 5, 6 and 7 of the brake carrier 4. Counter surfaces are formed by flap members 26 and 27 on the two sheet metal halves forming the actuating ring 18. It is evident from FIGURE 3, how these two sheet metal halves simultaneously form the cage for the rings 23, 24 and 25. Retracting springs 28 are suspended on the extensions 12 and 13 of the brake disks 8 and 9 and act to return the brake disks to their inoperative position after a braking operation.

In the embodiment according to FIGURES 5 and 6 the two sheet metal halves of the actuating ring 18 comprise inwardly directed projections 29 which have bores 30 accommodating pins 31. By means of roller bearings 32, the rollers 33, 34 and 35 are mounted on the pins and supported upon the brackets 5, 6 and 7 of the brake carrier 4.

If such a rolling support of the actuating ring would not be provided, the forces initiated by operation of the pinion 20 and acting at right angles to the braking axis, would urge the actuating ring out of its coaxial position, whereby the inclined paths of the actuating ring 18 would be displaced with respect to those of the pressure rings 8 and 9. The brake would then cease to function.

The brake carrier 4 of the example according to FIGURES 7, 8 and 9, which is screwed to an axle portion of the motor car, comprises three brackets 5a, 6a and 7a, upon which the two brake disks 8 and 9 are slipped and disposed so as to be freely movable in axial direction but fixed in circumferential direction. Brake linings 10 and 11 are adhesively affixed to the sides of the brake disks facing the abutting surfaces of the housing. Projections 12 or 13 on the brake disks 8 and 9 transmit the braking moment to the brake carrier 4. The pressure rings 14 and 15 punched from sheet metal are firmly connected with the brake disks 8 and 9. The rings are provided with a plurality of wedge surfaces inclnied in circumferential direction and uniformly distributed around the circumference. Rollers 16 and 17 serve again as coupling members and connect the pressure rings with the operating ring 18 which is composed of two specularly formed annular sheet metal pieces and provided on both sides with opposite wedge surfaces which are inclined in circumferential direction and angularly displaced relatively to the inclined wedge surfaces of the pressure rings 14 and 15. The operating ring, as in the previously described example, comprises an extension 19 which is situated between the extensions 5a and 6a of the brake carrier 4 and provided with internal gear teeth engaging with the pinion 20 of the operating shaft 21 mounted in the brake carrier. A lever 22 which introduces the braking force into the brake is keyed to the shaft 21. The shaft 21 is rotated by a pivoting movement of the lever 22 when the brake is operated. Rotation of the pinion 20 causes an angular movement of the ring 18, the rollers 16, 17 ascend on the wedge surfaces and the brake linings are forced against the abutting surfaces of brake housing 1 and brake cover 3.

The radial forces to which the ring 18 is subjected upon operation of the pinion 20 are taken up by rollers 23a which are mounted on pins 25a fixed in the brackets 5a, 6a and 7a of the brake carrier. Recesses 26a are provided in the brackets 5a, 6a and 7a of the brake carrier, in order to accommodate the rollers 23a. These recesses are formed so that the resistance moment of the brake carrier brackets receiving the braking moment is not reduced at this point since actually one half of the braking moment has to be taken up by the brake carrier brackets at each side of the recess 26a.

In the modification according to FIGURES 10 to 13, the brake carrier 4 screwed to an axle portion of the vehicle, comprises three brackets 5b, 6b and 7b on which brake disks 8 and 9 are mounted to be freely movable in axial direction, but fixed in circumferential direction. The brake disks carry at their outer sides brake linings 10 and 11, respectively. The two brake disks are provided at the sides opposite the brake lining with pressure rings 14 and 15, respectively which are provided with wedge surfaces 14' and 15', respectively, inclined in circumferential direction. The brake disk operating ring 18 is situated between the pressure rings 14, 15 and coaxial with the latter. The ring 18 is composed of two specular halves which are both formed with opposite wedge shaped surfaces 18' inclined in circumferential direction. Coupling rollers 16, 17 are mounted between the wedge surfaces of the pressure rings 14, 15 and those of the brake operating ring 18. Also in this embodiment the brake operating ring 18 is centered by means of rollers 23b which are supported on pins accommodated in a recess of the brake carrier brackets 5b, 6b, 7b. Retracting springs 28 connect the brake disks 8 and 9 to each other and return the latter to the position of rest after completion of a braking operation. The brake operating ring 18 comprises three inwardly projecting extensions 18a, in which an operating bracket 22a is secured by means of screws 18b. This bracket, the shape of which is visible in FIGURE 13, comprises three projections 22b which protrude into the brake housing between the brake cover 3 and the brake carrier 4. The flanged ends of the projections 22b of the operating bracket are connected to the ring 18 by means of the screws 18b. The operating bracket 22a carries an operating lever 22d which is pivotally connected by means of a bolt 22c to the bracket and by a link rod 40 to a brake cylinder 41 which is formed as a diaphragm cylinder in the present embodiment. Compressed air is supplied to the brake cylinder 41 by a hose 42. The operating lever 22d is composed of two halves secured together by rivets. Between the two halves of this lever a pivotally mounted screw threaded nut member 43 is arranged, in the threaded bore of which an adjusting spindle 44 is engaged. This spindle is provided with two opposite threads and is supported upon the operating bracket 22a by means of a fork member 45 and a bolt 46. When turning the screw spindle 34 the spacing between the bolt 46 and nut member 43 is varied, so that the brake can be readjusted.

When the brake is operated, compressed air passes through the brake hose into the diaphragm cylinder 41. The link rod 40 is urged out of the cylinder and the operating lever 22a is angularly moved by means of the actuating lever 22d and the readjusting spindle 44. The operating ring 18 then rotates through the same angle as the operating bracket 22a. Since the brake disks 8 and 9 and thus the pressure rings 14, 15 are fixed in circumferential direction, the rollers 16, 17 roll between the roller paths 14', 15' which are not moved in circumferential direction, and the roller paths 18' of the operating ring 18, which are moved in circumferential direction, and force the brake linings 10 and 11 of the brake disks 8 and 9 against the revolving surfaces of the brake housing 1 and brake cover 3 in opposition to the retracting springs 28. Any jamming of the system consisting of: actuating lever 22d—operating bracket 22a—brake operating ring 18, is avoided in that the components of the force transmitted by the link rod 40 to the braking members are supported in rolling condition by the rollers 16, 17 and 23b.

The disk brake shown in FIGURES 14 and 15 generally corresponds to the brake according to FIGURES 7 and 8. Also in this case each of the two brake disks 8 and 9 has its side situated opposite the brake lining provided with pressure rings 14 and 15, respectively, between which the brake operating ring 18 is arranged and centered by means of rollers 23b which are mounted in brake disk carrier brackets 5c, 6c and 7c. The brake ring 18 provided with wedge surfaces coacting with rollers 16 and 17 applies the brake linings of the brake discs 8 and 9 against the abutting surfaces of the brake housing when the ring 18 is turned.

Projections 51 are secured to the brake ring 18 by means of pins 50 and engage the forked end of tappets 52. A hydraulic plunger 53 reciprocating in a cylinder 54 of a hydraulic brake operating device is operatively connected to the other end of each tappet 52. Three cylinders 54 are screwed to the brake carrier 4a. A projection 55 of the brake lever 22e which is pivotally mounted on the brake carrier 4a by means of a pin 56, can be applied against one of the projections 51 of the ring 18. This brake disk may thus be operated either manually or hydraulically, the brake operating ring being angularly displaced, either by manual operation of the lever 22e and projection 55, or by operation of the hydraulic plungers 53 and tappets 52.

I claim:

1. A disk brake comprising a revolving brake housing, a brake carrier, a plurality of axially extending circumferentially spaced brackets on said brake carrier, brake disks mounted on said brackets so as to be axially movable but fixed in circumferential direction, a brake actuating ring mounted coaxially between said brake disks, said brake actuating ring being movable in a circumferential direction, brake linings on said brake disks on the sides thereof opposite said brake actuating ring, said brake disks and said brake actuating ring being provided with opposite wedge surfaces, rolling coupling members inserted between opposite wedge surfaces of said ring and of said brake disks, brake operating means for effecting circumferential movement of said actuating ring relatively to said brake disks, whereby said wedge surfaces coacting with said coupling rollers cause an axial movement of said brake disks, and at least three circumferentially spaced rolling members mounted between said axially extending brake carrier brackets and said brake actuating ring for supporting and centering said ring.

2. A disk brake according to claim 1, in which said rolling members for centering said brake actuating ring comprise loosely mounted rings engaging the brake actuating ring and rolling on opposite running surfaces provided on the brake actuating ring and on said surfaces of the brake carrier brackets.

3. A disk brake according to claim 1, in which said rolling members comprise cylindrical centering rolls which are mounted on bearing pins carried by said brake actuating ring and supported on running surfaces provided on said brake carrier brackets.

4. A disk brake according to claim 1, in which said rolling members comprise pins mounted on said brake carrier brackets, running surfaces provided on the periphery of said braking actuating ring, cylindrical center rollers mounted on said pins rolling on said surfaces, the axial width of said centering rolls being greater than the width of said running surfaces on said brake actuating ring.

5. A disk brake according to claim 4, in which said brake carrier brackets having recesses and said cylindrical centering rolls being located in said recesses.

6. A disk brake according to claim 5 in which each brake carrier bracket carries a pair of cylindrical centering rolls mounted parallel to the axis of the brake and spaced in circumferential direction.

7. A disk brake according to claim 1 comprising a brake operating bracket having a plurality of axial projections corresponding to the number of said brake carrier brackets, said projections protruding into the brake housing between a wall of the revolving housing and the fixed brake carrier for operative connection with the brake actuating ring.

8. A disk brake according to claim 7, in which the brake carrier comprises three brackets each having secured thereon a projection of said brake operating bracket, said operating bracket consisting of an open annular sheet metal stamping.

9. A disk brake according to claim 1, in which cylinder and plunger operated devices are provided between the brake carrier and the brake actuating ring.

10. A disk brake according to claim 9, in which radial extensions are provided on said brake actuating ring operated by said plunger devices and the cylinders of said plunger operated devices being mounted on said brake carrier.

References Cited by the Examiner

UNITED STATES PATENTS

| 1,696,879 | 12/1928 | Chase. | |
| 2,329,097 | 9/1943 | Ash | 188—72 X |
| 2,595,859 | 5/1952 | Lambert et al. | 188—72 |
| 2,914,141 | 11/1959 | Klaue | 188—72 |

FOREIGN PATENTS

| 876,953 | 5/1953 | Germany. |
| 1,101,189 | 3/1961 | Germany. |
| 1,126,750 | 3/1962 | Germany. |
| 607,004 | 7/1960 | Italy. |

FERGUS S. MIDDLETON, *Primary Examiner.*

EUGENE G. BOTZ, ARTHUR L. LA POINT,
*Examiners.*